No. 714,637. Patented Nov. 25, 1902.
A. G. DAVIS.
METHOD OF INCREASING THE NUMBER OF PHASES OF ELECTRIC CURRENTS.
(Application filed Apr. 16, 1902.)
(No Model.) 2 Sheets—Sheet 1.

WITNESSES: INVENTOR:

No. 714,637. Patented Nov. 25, 1902.
A. G. DAVIS.
METHOD OF INCREASING THE NUMBER OF PHASES OF ELECTRIC CURRENTS.
(Application filed Apr. 16, 1902.)
(No Model.) 2 Sheets—Sheet 2.

WITNESSES:
Harry A. Tilden.
Helen Oxford

INVENTOR:
Albert G. Davis

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

METHOD OF INCREASING THE NUMBER OF PHASES OF ELECTRIC CURRENTS.

SPECIFICATION forming part of Letters Patent No. 714,637, dated November 25, 1902.

Original application filed June 25, 1897, Serial No. 642,239. Divided and this application filed April 16, 1902. Serial No. 103,151. (No model.)

*To all whom it may concern:*

Be it known that I, ALBERT G. DAVIS, a citizen of the United States, residing at Schenectady, county of Schenectady, State of New York, have invented certain new and useful Improvements in Methods of Increasing the Number of Phases of Electric Currents, (Case No. 2,837,) of which the following is a specification.

This application is a division of my application Serial No. 642,239, filed June 25, 1897.

My invention consists in a novel method of increasing the number of phases of an alternating electric current, and is particularly useful in connection with systems of electrical distribution in which it is desired to supply multiphase translating devices from single-phase mains.

In practicing my invention I provide a plurality of sources of electromotive force—preferably, though not necessarily, counter electromotive force—dephased from each other by a definite and fixed amount, and I prefer to connect these sources in series across each pair of the mains carrying the current whose number of phases is to be increased. The electromotive forces of these sources being dephased from each other form with the electromotive force on the mains a system of polyphase electromotive forces of an order depending on the number of phases of electromotive force of the sources and on the order of the original system. For example, it is possible to join two armatures, mechanically or otherwise, so that their electromotive forces are dephased by ninety degrees and to connect them in series across a pair of single-phase mains. With this arrangement a two-phase system of currents and electromotive force may be obtained. In a similar manner it is possible to obtain a three-phase system.

Figure 1:
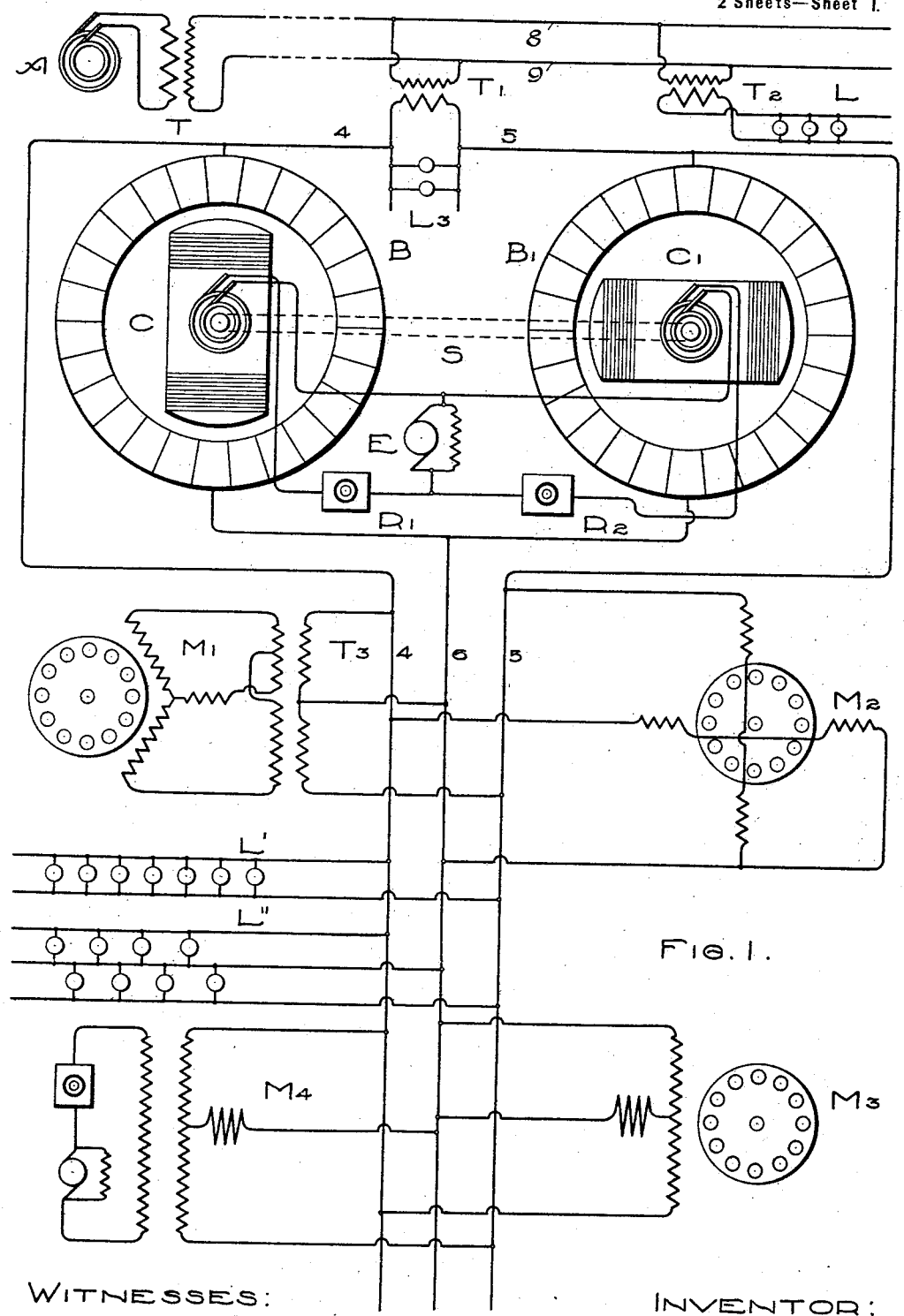
Figure 2:
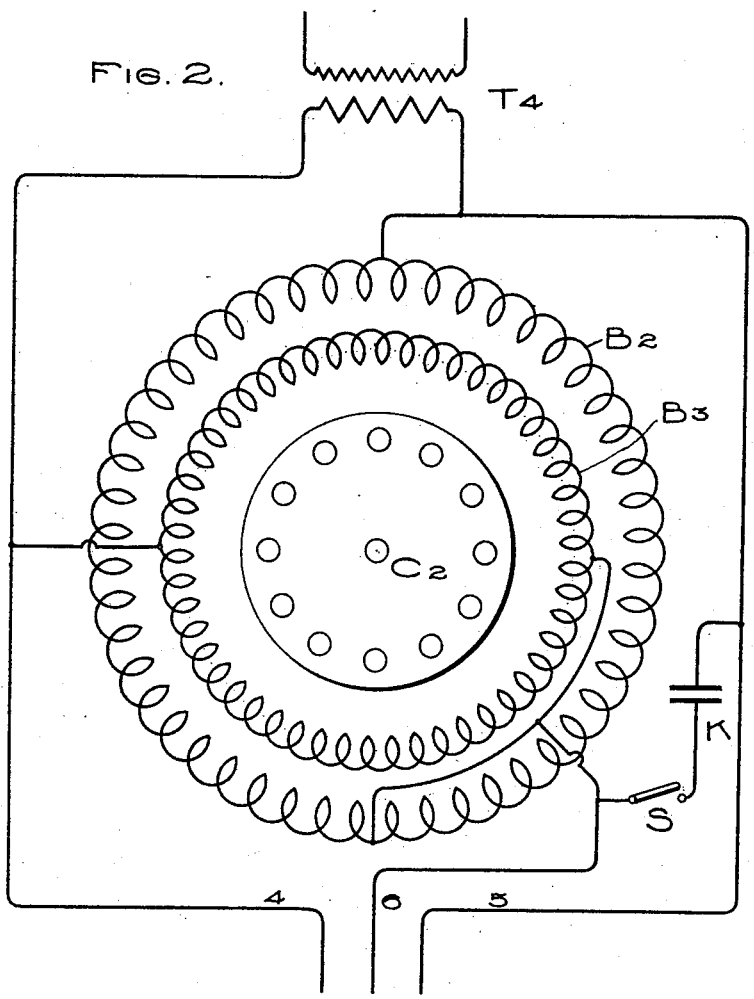
Figure 3:
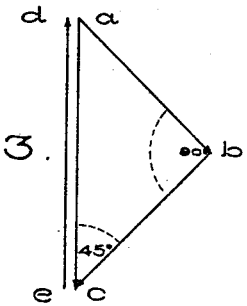
Figure 4:
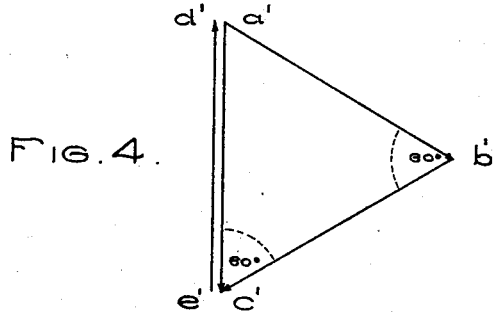

In the annexed drawings, which illustrate apparatus for carrying out my invention, Figure 1 is a general view of a single-phase system of distribution with means for supplying two-phase currents to a translating device connected thereto. Fig. 2 is a view of a modification, and Figs. 3 and 4 are vector diagrams.

Referring more particularly to Fig. 1, A represents a single-phase generator feeding a pair of mains 8 9 through the step-up transformer T. Connected to these mains are other transformers, as T' T². At those portions of the system where single-phase translating devices only are desired these transformers are connected to a pair of secondary mains in the usual way. Such an arrangement is illustrated at T², where lamps L are shown in multiple with the secondary mains; but at points where multiphase currents are desired, as at T', I provide a novel phase-modifier, by means of which the method constituting the subject-matter of this application is carried out. It will be seen that the mains 4 and 5, leading from the secondary winding of T', are connected to the primary windings B B' of a pair of synchronous dynamo-electric machines connected in series across the lines. These machines are preferably motors, but may, if preferred, receive external power. The secondary members C C' of these machines, which in the form shown are the direct-current members, are rigidly coupled together, as by the shaft S, in such a way that the electromotive forces or counter electromotive forces of the two machines are dephased. In the place of the rigid mechanical connection I may, of course, make use of any mechanical or electrical or other means which will secure the desired result of rigidly maintaining a fixed and definite phase relation in the counter electromotive forces of the motor-windings. The members C C' are shown as excited from the direct-current exciter E, and their excitation is controlled by the adjustable resistances R' R², as usual.

In the specific form illustrated the phase-angle between the electromotive forces of the two motors is ninety degrees. Let the vector $ed$, Fig. 3, represent in magnitude and phase the impressed electromotive force at the secondary terminals of T'. Let $ab$ and $bc$, two vectors, such that the angle $abc$ is ninety degrees, represent the electromotive force of the two auxiliary machines. Then if the two field-magnets C C' are properly adjusted the vectors $ab$ and $bc$ will form with their resultant $ac$ an isosceles right triangle, and the resultant may be made equal in magnitude to the impressed electromotive force *ed* and opposite in phase. Therefore the electromotive forces *ab*, *bc*, and *de* are such that two-phase currents flow in the system 4 5 6, connected to the outer terminals and to the point intermediate the windings.

I have shown various translating devices connected with the mains, as motors $M'$ $M^2$ $M^3$ $M^4$. $M'$ is a three-phase motor fed through the phasing-transformer $T^3$. This phasing-transformer is of the well-known Scott type, and need not be particularly described herein. $M^2$ is a two-phase induction-motor of any preferred type. $M^3$ is a monocyclic induction-motor, so wound as to take current from the main 6 only when starting, as is well understood in the art. A synchronous motor may be used, if preferred, and I have shown a monocyclic synchronous motor at $M^4$, provided with a separate exciter and rheostat.

High-voltage lamps $L'$ may be connected across the mains 4 5, while low-voltage lamps $L''$ may be inserted, as is usual, in two-phase systems. I have also shown lamps $L^3$ connected direct to the secondary terminals of the transformer $T'$, where they will not tend to unbalance the system.

As indicated in Fig. 4, the angle between the two auxiliary sources of electromotive force may be made one hundred and twenty degrees, when a three-phase system will be formed, the vectors being $a'b'$, $b'c'$, and $d'e'$.

It is obvious that by suitably choosing the number and phase-angles of the auxiliary sources of electromotive force any preferred system may be obtained.

I have shown the improved phase-modifier, by means of which my present invention is carried out, applied to a single-phase system, but it is obvious that it may be applied to any system whatever. Each phase-modifier so applied will serve to increase the number of phases of electromotive force between the two terminals across which it is connected.

I have illustrated in Fig. 2 another form which the improved phase-modifier may take. $T^4$ is a source of electromotive force and may be a transformer connected to a single-phase system at any desired point. $B^2$ $B^3$ are two angularly-displaced primary windings, preferably on a single core, connected in series as shown. $C^2$ is the secondary member, which may be of any suitable type—as, for example, similar to C or $C'$, Fig. 1. I have, however, shown it as a short-circuited rotor. When once started, this device will run as a single-phase induction-motor, but the counter electromotive forces of the two windings $B^2$ and $B^3$ are dephased, as one winding is in advance of the resultant polar line, while one is behind it. The dephased counter electromotive forces act as do the electromotive forces or counter electromotive forces of B and B', Fig. 1, and the wires 4 5 6, connected to the outer and intermediate terminals of the two windings, form a multiphase system, the phase-angles of which depend on the angles between the connection $B^2$ and $B^3$.

In order to start the armature $C^2$, I have illustrated a condenser K with a suitable switch S in multiple with one of the inducing-windings, as $B^2$. When the switch S is closed, this condenser tends to advance the current in $B^3$, with which it is in series, and to lag the current in $B^2$, with which it is in shunt, and a rotary field is created, which causes the armature to start. When a proper speed is attained, the switch S is opened and the machine runs as an induction-motor, as before stated, supplying multiphase currents to the mains 4 5 6.

Although I have shown in the present application various forms of a phase-modifier by means of which my invention may be practiced, it will be evident that my invention is not restricted to any particular apparatus.

What I claim as new, and desire to secure by Letters Patent of the United States, is—

1. The method of increasing the number of phases of an electric current from a source of alternating electromotive force, which consists in opposing an electromotive force from said source by the resultant electromotive forces of a plurality of sources, and rigidly maintaining fixed the relative phase relations of the component electromotive forces going to make up the said resultant, substantially as set forth.

2. The method of changing single-phase current to multiphase, which consists in supplying said current to a plurality of motor-windings connected in series, maintaining by external means a fixed and definite phase relation between the counter electromotive forces of the motor-windings, and taking off dephased currents due to various electromotive forces of the resulting system.

In witness whereof I have hereunto set my hand this 15th day of April, 1902.

ALBERT G. DAVIS.

Witnesses:
BENJAMIN B. HULL,
HELEN ORFORD.